Fig. 6.
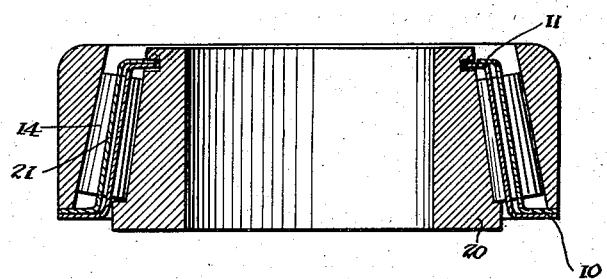
Fig. 7.
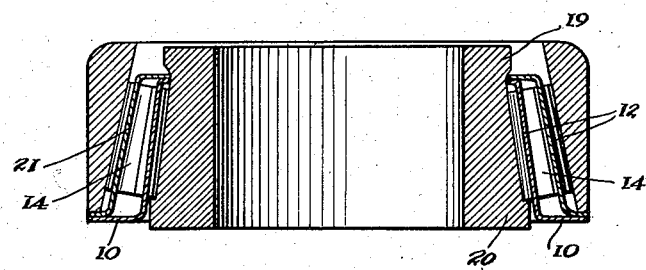
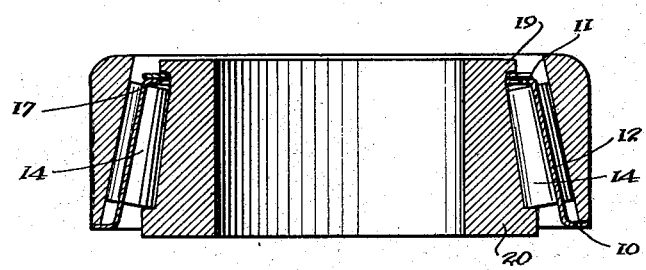
Fig. 8.

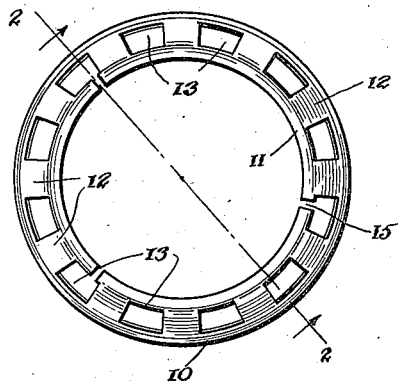
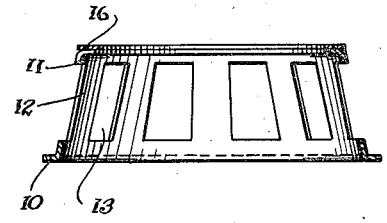
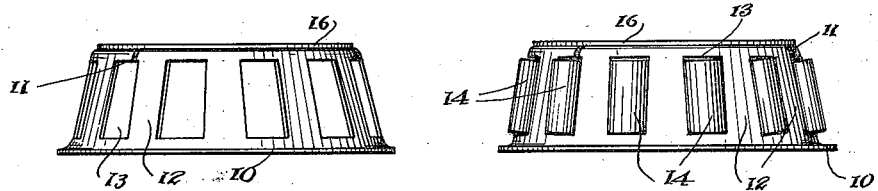
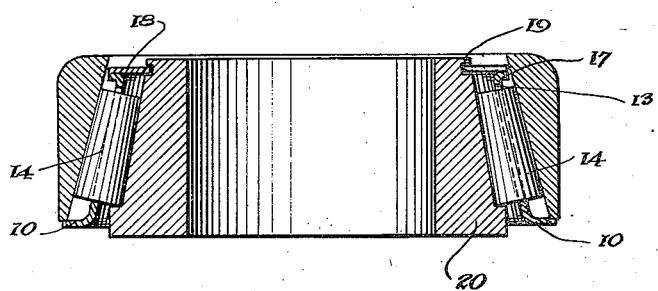

Patented May 20, 1924.

1,494,712

UNITED STATES PATENT OFFICE.

FREDERICK WILLIAM SCHEFFLER, OF NEW LENOX, ILLINOIS, ASSIGNOR TO WILLIAM E. PRATT MANUFACTURING COMPANY, OF CHICAGO, ILLINOIS.

ROLLER BEARING.

Application filed November 24, 1923. Serial No. 676,807.

*To all whom it may concern:*

Be it known that FREDERICK WILLIAM SCHEFFLER, citizen of the United States, residing at New Lenox, in the county of Wills and State of Illinois, has invented certain new and useful Improvements in Roller Bearings, of which the following is a specification.

This invention relates to roller bearings, and has special reference to the roller cage used in connection with conical bearings.

More particularly, the invention relates to a roller bearing having a cage which may be readily positioned on the bearing cone and there permanently held.

In various forms of conical roller bearings, provision is made for retaining the bearing cage on the cone. In some instances, this provision consists simply of providing a flange at the inner end of the bearing cage and a slide rib or combination flange at the inner end of the cone, the internal diameter of the cage flange being slightly less than the external diameter of the rib. In such instances, the assembling of the parts is effected by forcibly pressing the cage over the cone so that the smaller end of the cage is expanded. This frequently results in a distortion of the smaller end of the cage from its truly circular form, and in consequence, the rollers held by the cage are shifted out of true position with reference to the cone so that instead of having their axes all lying in the circus of the same cone, the axes of some of the rollers will move to a substantially tangential position. Consequently, there will not be true rolling contact between the rollers and the cone, and wear will be rapid and injurious.

One important object of the present invention is to provide a cage construction wherein the inner end of the cage will be in the form of an expansible ring produced by slitting one part of this inner end at one or the same place and then, after assembling the cage on the cone, preventing this expansion by connecting the two parts of said inner end, the remaining part being inexpansible.

This object may be effected in a variety of ways, the inner end of the cage may be provided with an integral flange split at a series of points so that it may expand freely over the rib on the inner end of the cone, and then there may be applied to this flange a second inner end element in the form of a complete ring which is riveted or welded to the split flange after the same is in position, thus preventing re-expansion of the inner end and positively locking the same on the cone. In this case, the split flange will engage behind the rib.

A second way of accomplishing this is to have the flange of such size as to slip freely over the rib, splits being thus unnecessary, and riveting or spot welding to the flange, after assembly, a split ring of such size that it must be expanded to slip over the rib. In this instance, the split ring forms the locking means.

With the above and other objects in view as will be hereinafter apparent, the invention consists in general of certain novel details of construction and combinations of parts hereinafter more fully described, illustrated in the accompanying drawings, and specifically claimed.

In the accompanying drawings like characters of reference indicate like parts in the several views, and;—

Figure 1 is a view from the inner end of a bearing cage showing a form employing a split flange.

Figure 2 is a section of the cage on the line 2—2 of Figure 1, with the inner end loose ring in position.

Figure 3 is a side elevation of the complete bearing with the outer cone removed.

Figure 4 is a side elevation of the cage.

Figure 5 is a diametrical section through a modification employing a solid flange and split ring.

Figure 6 is a view of a second modification employing two cage members arranged in parallelism.

Figure 7 is a view of a form similar to Figure 6, but with the cage members arranged in converging relation.

Figure 8 is a further modification employing a split ring.

One preferred form of the invention is shown in Figures 1 to 4, and in this form it will be seen that the cage consists of a sheet metal member having an outwardly turned flange at one end, and an inwardly turned flange at the other end, these flanges constituting rings and being connected by spaced bars 12 arranged to provide spaces 13 for the reception of the bearing rollers 14. The flange 11 on the smaller end is provided with a series of slits 15 opening into the roller receiving openings 13. Now with this construction it is obvious that the cage may be slipped over a cone of the usual type, and that this smaller cage end will freely expand without becoming permanently distorted so that when in position the rollers will be held in proper relation to the cone. It is also obvious that such an arrangement readily lends itself to accidental displacement, and to prevent this the inner cage end is completed by securing to the flange 11 a closed ring 16.

In the form shown in Figure 5, there is employed instead of the split flange 11 a closed flange 17, and in place of the ring 16, there is employed a split ring 18 which is of smaller internal diameter than the rib 19 at the smaller end of the inner cone 20.

In the form shown in Figures 6 and 7, the ring 18 is replaced by a second cage element 21 similar in all respects to the cage element just described, but having the flange at the smaller end closed, the two flanges being riveted together or spot welded, as the case may be.

In the form shown in Figure 8, a form closely allied to that shown in Figure 5 is disclosed, the closed flange 17 being turned inward instead of outward.

It will be observed that in each of these instances, the inner end of the cage substantially comprises two members, one being closed and the other slit, and the slit member requiring to be expanded to go over the cone rib.

There has thus been provided a simple and efficient device of the kind described and for the purpose specified.

It is obvious that minor changes may be made in the form and construction of the invention without in any way departing from the material spirit thereof. It is not, therefore, desired to confine the invention to the exact form herein shown and described, but it is wished to include all such as properly come within the scope claimed.

Having thus described the invention, what is claimed as new, is;—

1. In a roller bearing, a roller retaining cage having at its inner end a circumferentially expansible element and a circumferentially inexpansible element fixed to the expansible element subsequent to assembly of the cage on a bearing cone.

2. In a roller bearing, a cage consisting of a member of general frusto-conical form providing intermediate its ends with slots for the reception of bearing rolls, a laterally extending flange at the larger end of the member, a second laterally extending flange at the smaller end of the member, one of said flanges being split to permit expansion and contraction of said smaller end, in combination with a retaining ring permanently secured to the last mentioned flange to prevent expansion thereof.

3. The combination in a roller bearing having an inner frusto-conical cone provided with a cage retaining ring at its smaller end, of a cage of substantially frusto-conical form having a series of longitudinal slots for receiving and holding bearing rolls, said cage further having at its inner end a circumferentially expansible ring and a circumferentially inexpansible ring at least one of which engages behind the cone rib to retain the cage on the cone, said rings being permanently secured together after assembly on the cone.

4. The combination in a roller bearing having an inner frusto-conical cone provided at its smaller end with a cage retaining rib; of a cage consisting of a frusto-conical member provided with an inwardly projecting flange at its smaller end of less internal diameter than the external diameter of said rib; said flange being split to permit its being expanded over said rib without permanent distortion.

5. The combination in a roller bearing having an inner frusto-conical cone provided at its smaller end with a cage retaining rib; of a cage consisting of a frusto-conical member provided with an inwardly projecting flange at its smaller end of less internal diameter than the external diameter of said rib, said flange being split to permit its being expanded over said rib without permanent distortion, and means permanently secured to said flange after it is positioned on the cone to prevent its further expansion.

6. The combination in a roller bearing having an inner frusto-conical cone provided at its smaller end with a cage retaining rib; of a cage consisting of a frusto-conical member provided with an inwardly projecting flange at its smaller end of less internal diameter than the external diameter of said rib, said flange being split to permit its being expanded over said rib without permanent distortion, and means permanently secured to said flange after it is positioned on the cone to prevent its further expansion, said means comprising a second similar cage member having a similar flange of greater internal diameter than the external diameter of the rib, said flange being permanently connected at a series of points between the slits of the first flange.

7. In combination, a roller bearing inner cone pivoted at its small end with a circumferentially groove and at its large end a rib frusto-conical roller surrounding said cone, and a retaining cage for said rollers having a flange entering said groove, said cage comprising a pair of frusto-conical members having a contacting outwardly extending flange at their larger ends, said outwardly extending flanges being split to permit an expansion of the cage.

8. The combination in a roller bearing having an inner frusto-conical member provided with a flange at its smaller diameter, said flange being split to permit its expansion without permanent distortion for the purpose of positioning the rolls upon the cone and means permanently secured to said flange after it is positioned on the cone to prevent its further expansion.

In testimony whereof I affix my signature.

FREDERICK WILLIAM SCHEFFLER.